Patented June 4, 1940

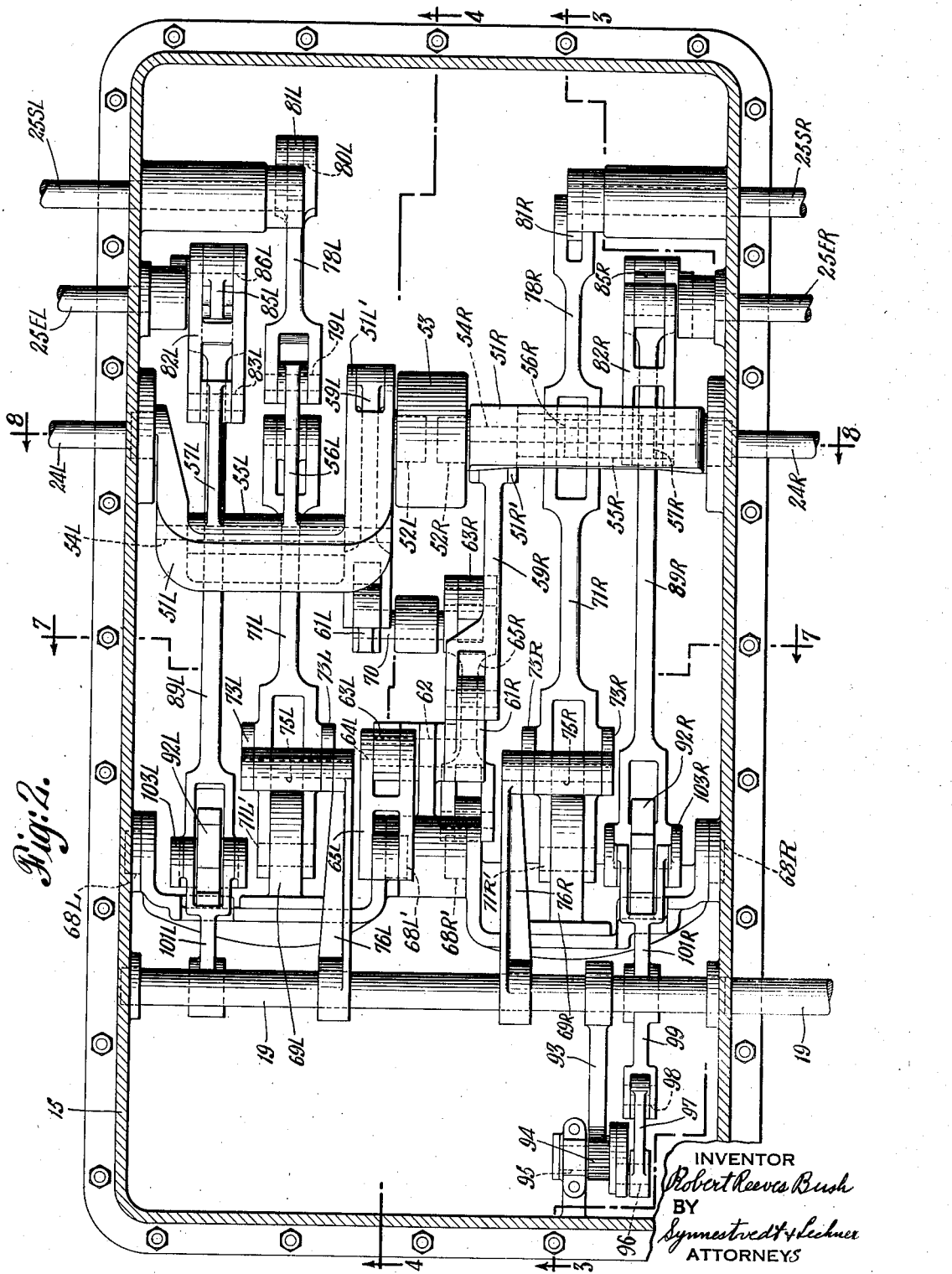

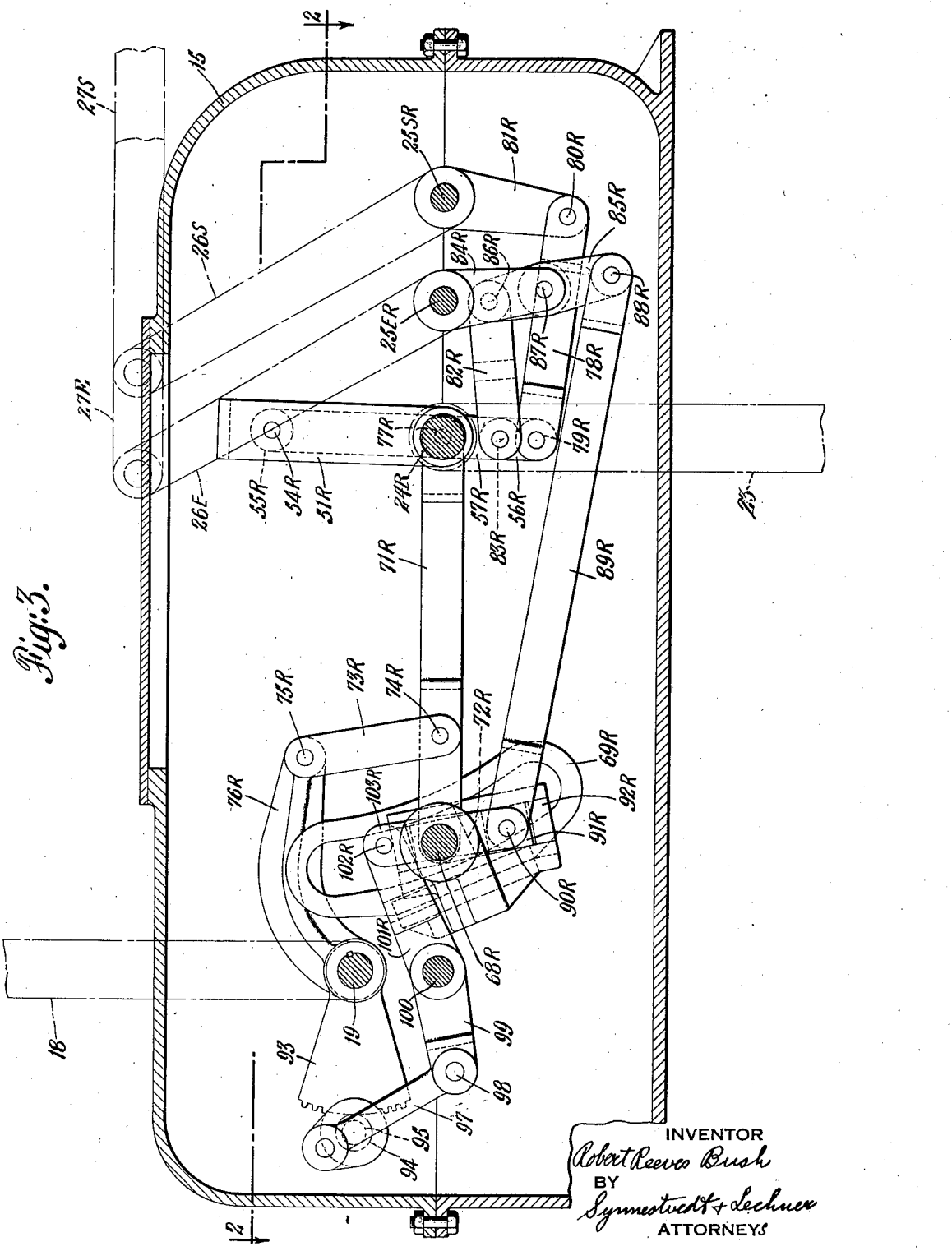

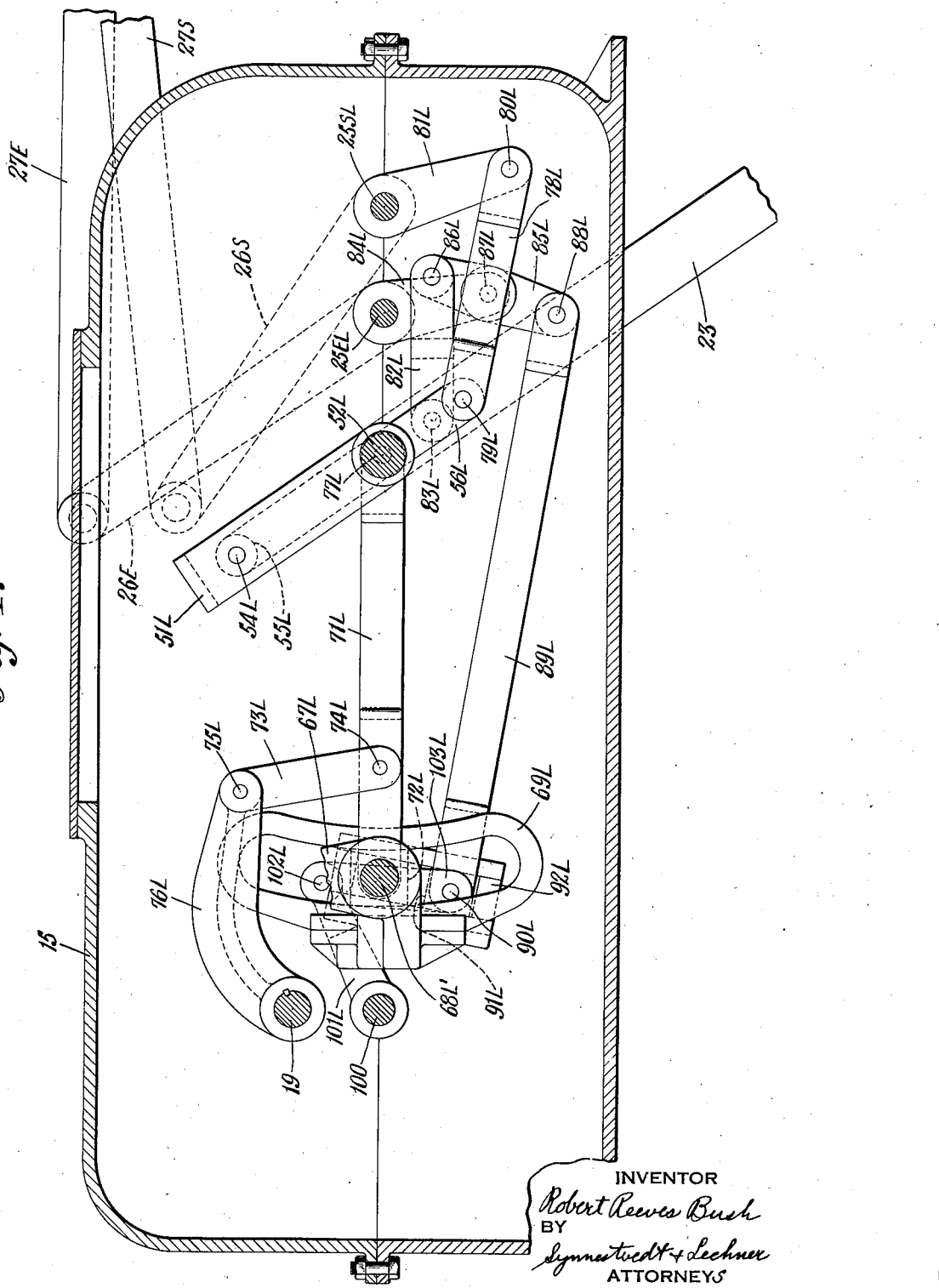

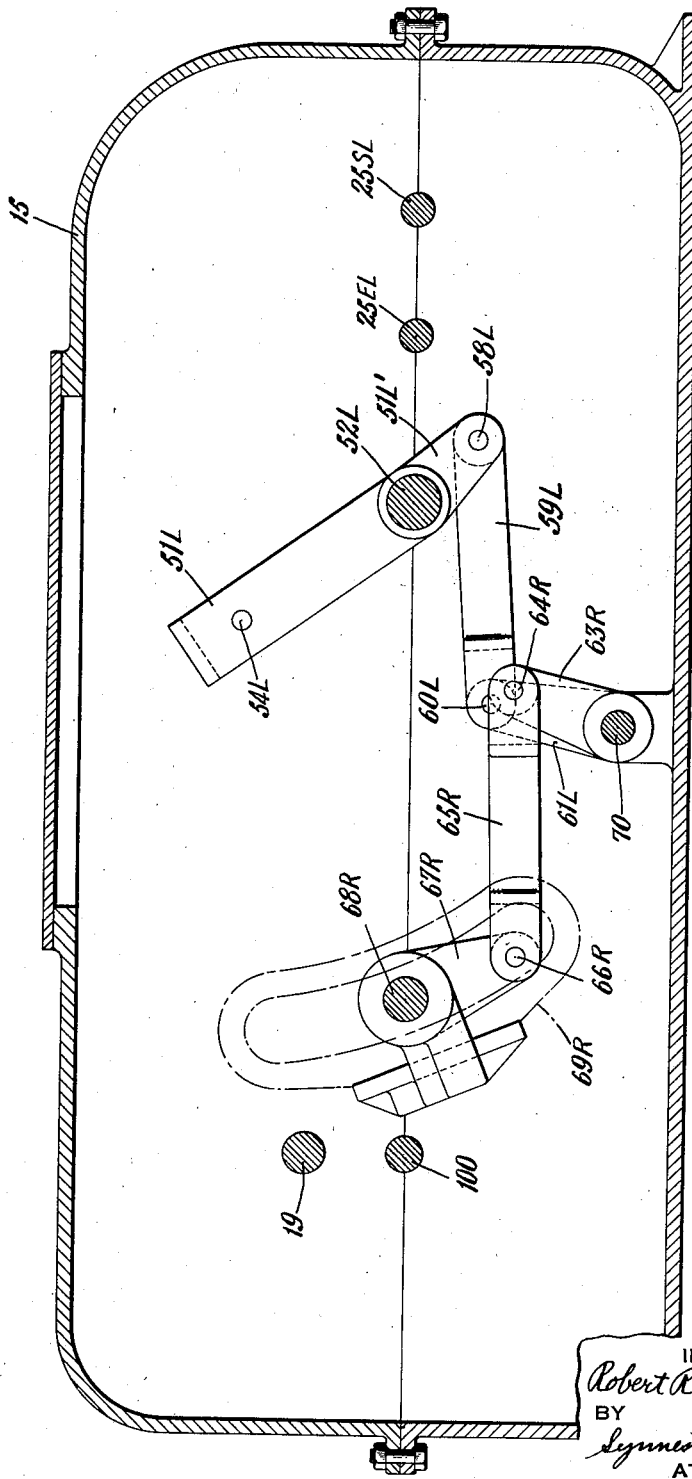

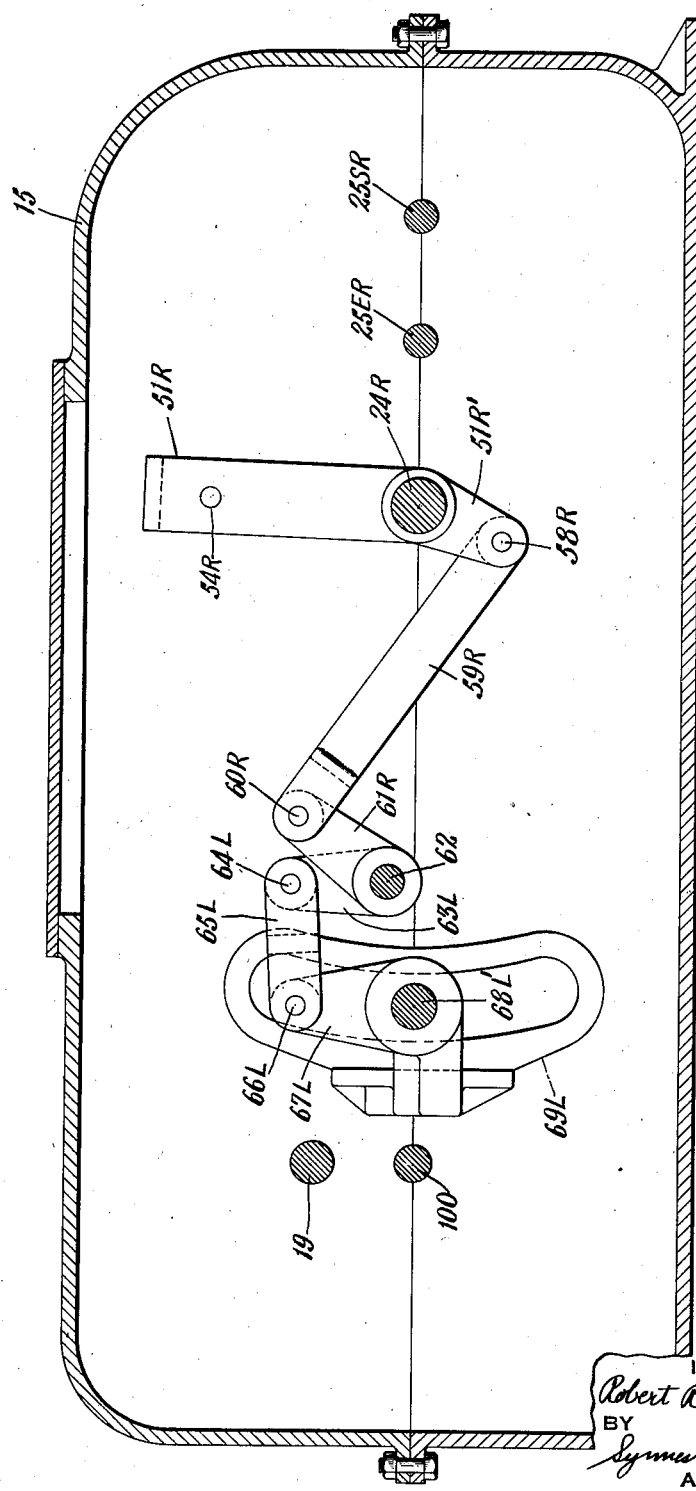

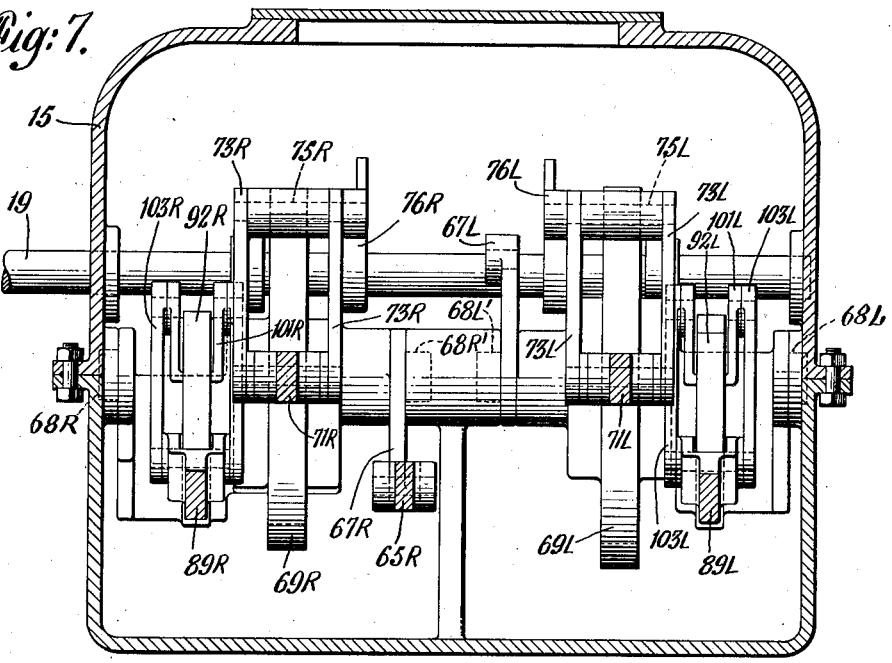
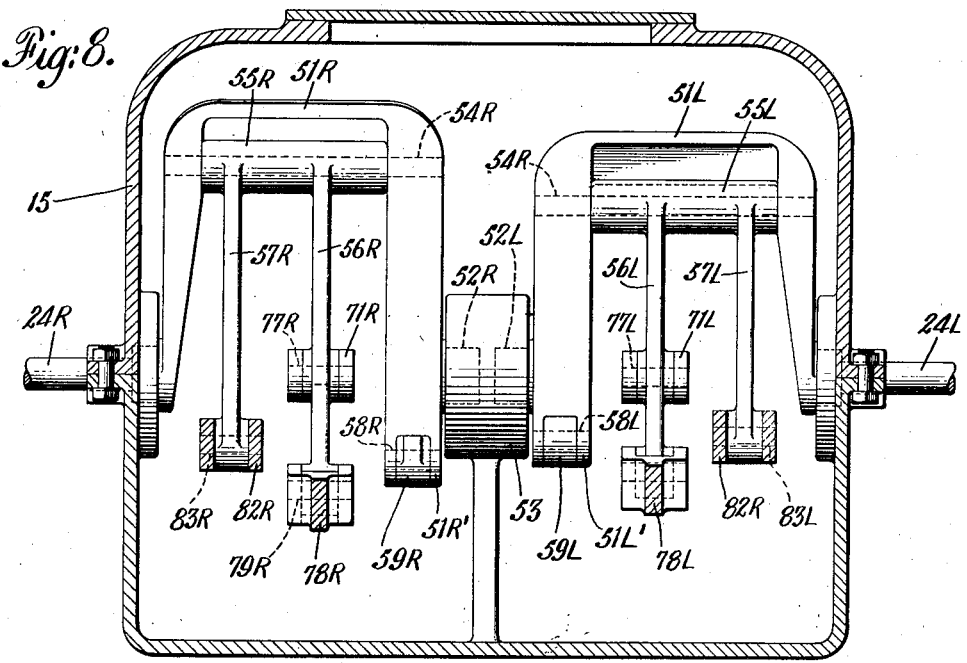

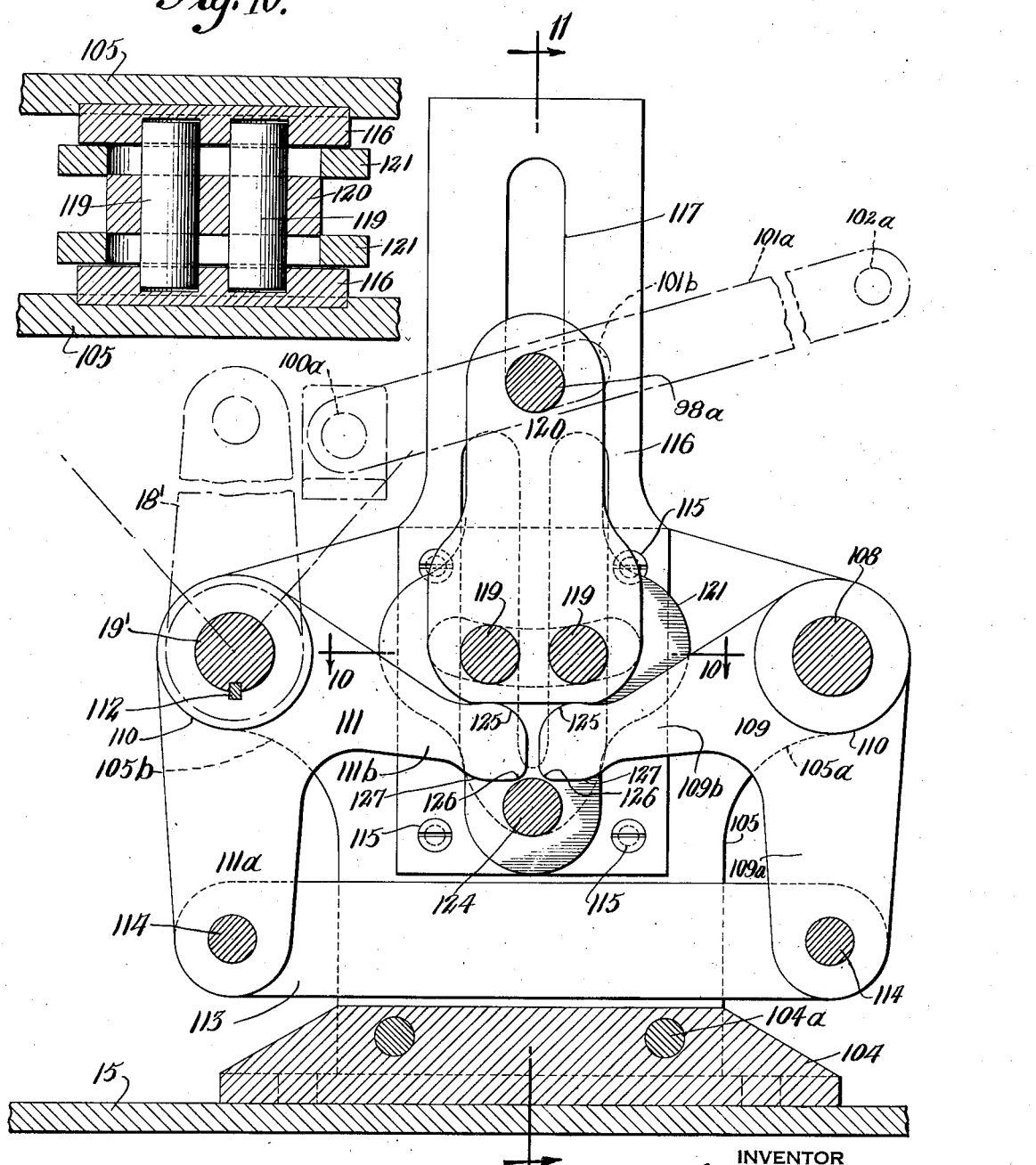

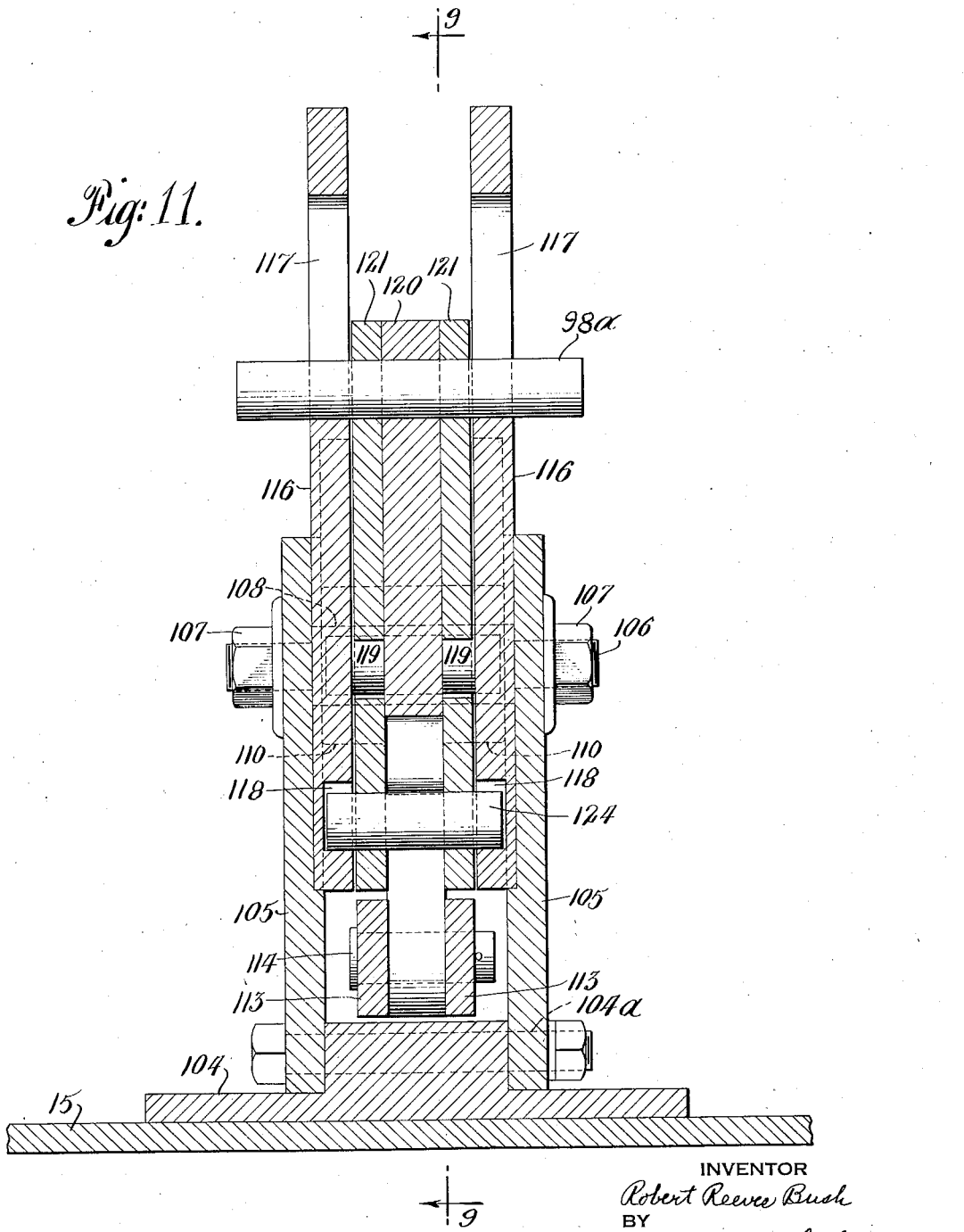

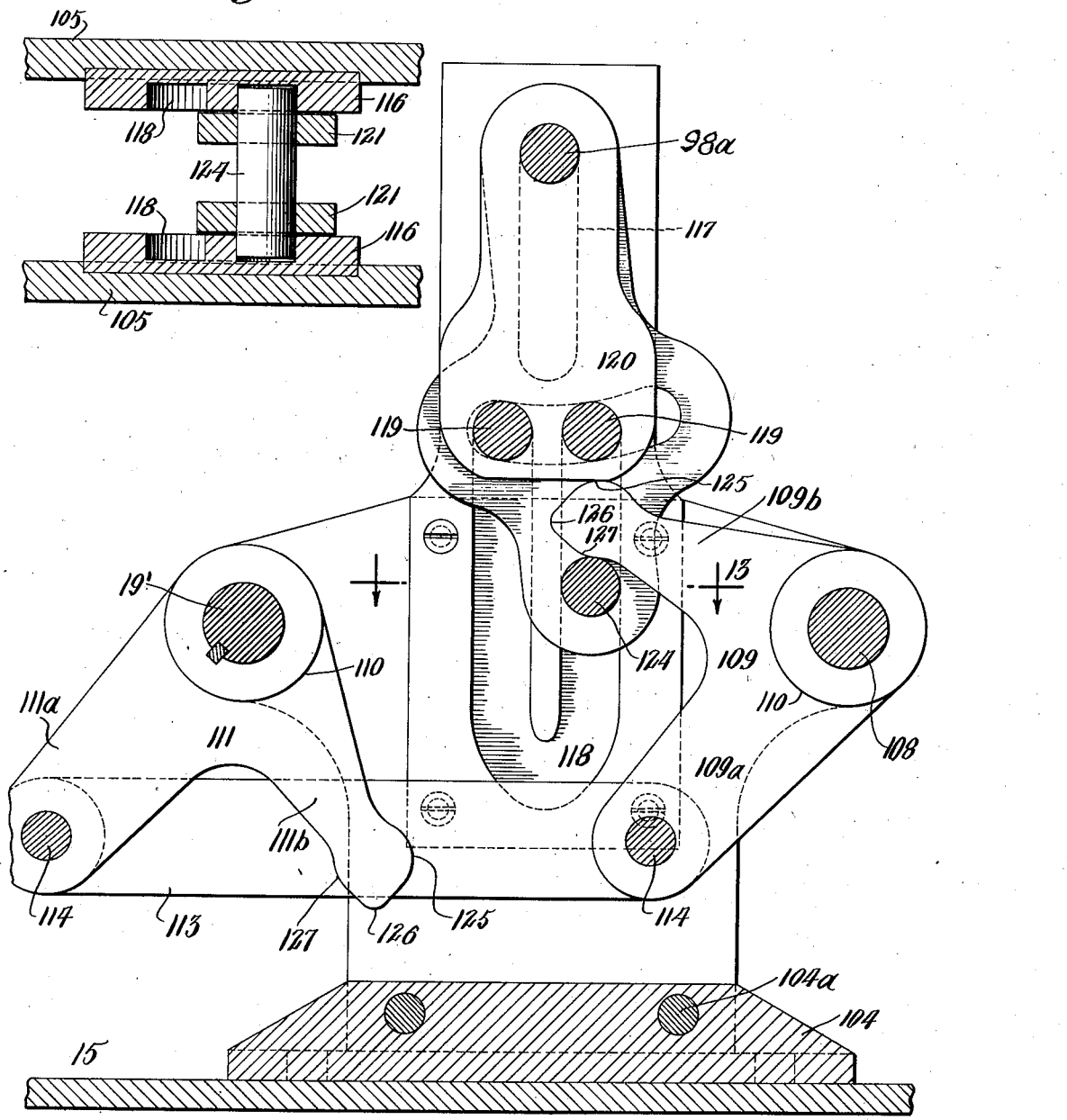

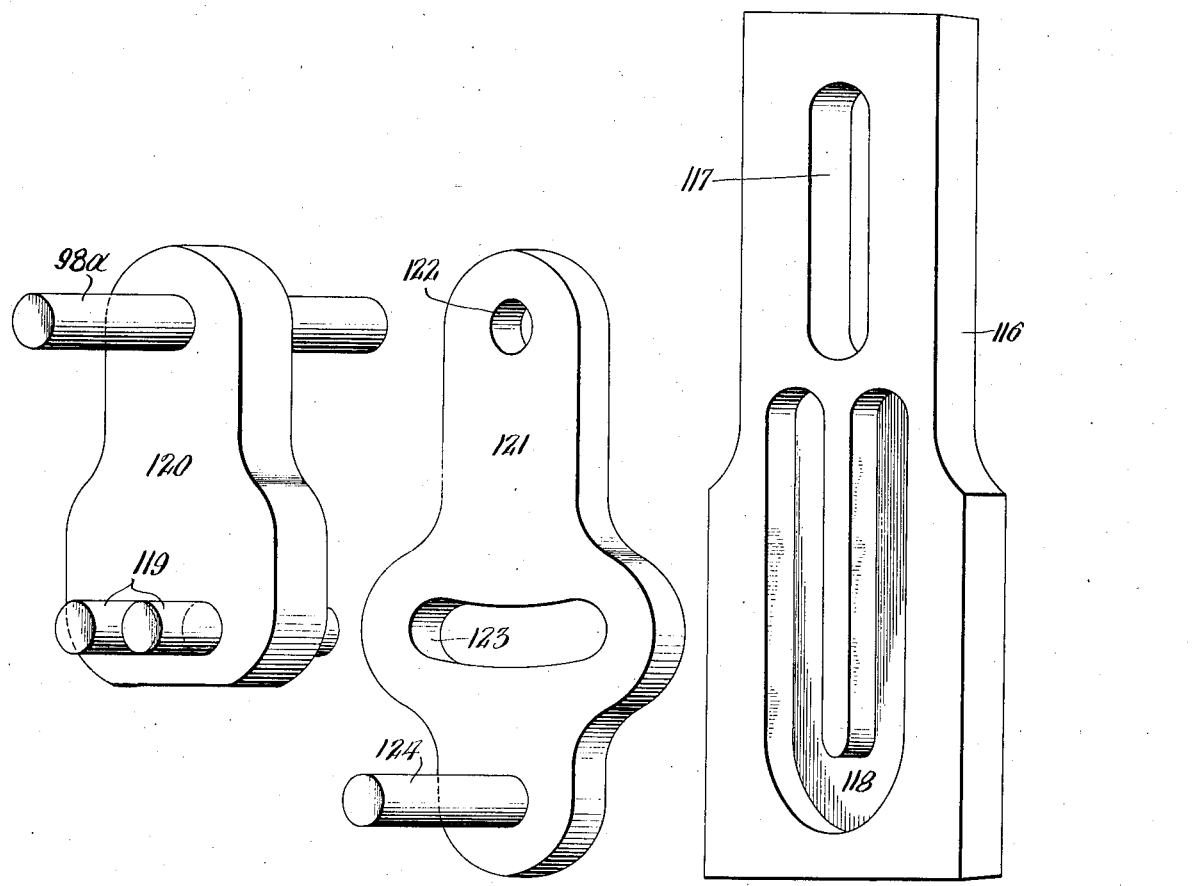

2,203,379

UNITED STATES PATENT OFFICE 2,203,379

ADJUSTABLE VALVE GEAR FOR STEAM ENGINES

Robert Reeves Bush, Lima, Ohio, assignor to Lima Locomotive Works, Incorporated, Lima, Ohio, a corporation of Virginia Application July 13, 1938, Serial No. 219,070

22 Claims. (Cl. 121—116)

This invention relates to adjustable valve gear for steam engines, and more particularly to locomotive valve gear of the adjustable and reversible type.

Although in its broader aspects the valve gear of the present invention is adaptable to operate a variety of types of steam distribution valves in locomotives and is adapted to be actuated from various of the reciprocating and/or rotating parts of the locomotive running gear, yet the invention is especially advantageous when employed in association with poppet valves and when actuated from the cross-heads at the two sides of the locomotive engine, and it will therefore be described herein with reference to such an installation. For a fuller disclosure of this field of application, reference may be made to certain copending applications of William E. Woodard, which may be briefly mentioned as follows:

In application 58,504, filed January 10, 1936, which issued November 15, 1938, as Patent 2,-136,405, there is disclosed a valve motion mechanism centrally disposed between the cylinders and adapted to variably and reversibly combine motions derived from the crossheads at the two sides of the locomotive engine and to utilize the combined motion for actuating admission poppet valves and exhaust poppet valves for both cylinders of the locomotive.

In application 121,398, filed January 21, 1937, which issued November 29, 1938, as Patent 2,-138,053, there is disclosed a valve motion mechanism for locomotive engines, wherein the motions of a plurality of actuating parts are combined in one ratio for the timing of the admission valves and in a different ratio for the timing of the exhaust valves, whereby an improvement in the valve events is effected, notably a delaying of the release and compression events as compared with previous practice, particularly when the valve gear is adjusted to effect early cut-off.

In application 217,360, filed July 5, 1938, there is disclosed a valve motion mechanism for fluid pressure engines wherein a further improvement of the timing of the valves is secured, particularly by effecting an adjustable combining of the motions derived from the two crossheads which is progressively differentially varied with respect to the timing of the exhaust valves and the admission valves.

The present invention involves improvements especially in this field, and more particularly a new and useful mechanism for securing the differential adjustability with respect to the timing of the exhaust valves and the admission valves, whereby to obtain the desired delay of the release and compression events as the cut-off adjustment is progressively shortened.

More specifically, the invention involves the provision, in a valve gear having separate take-off connections from the combining lever mechanism to the admission and exhaust valves, of means for progressively altering the motion taken off from the exhaust combining levers differentially with respect to the motion taken off from the admission combining levers (with progressive change of the valve gear cut-off adjustment) by introducing into or combining with the said motion derived from the exhaust combining levers a variable component of motion derived from parts adjustably associated with the swinging links or equivalent parts of the valve gear.

Still more specifically, the invention involves, in a valve gear of this general character, the interposition of a secondary combining lever in the series of connections to the exhaust valve means, said secondary combining lever receiving a part of its motion from the primary exhaust combining lever, and part of its motion from an adjustable connection with the swinging link, and further the adjustment of the last named connection in coordination with and preferably by means of the main reversing device which reverses and adjusts the cut-off of the valve gear.

Still further, the invention contemplates the co-ordination of the above mentioned advantages with various advantages heretofore secured in mechanisms such as disclosed in the above mentioned copending applications.

In addition, the invention involves a specific improvement in the mechanical movement for transmitting the variable motion from the main reversing mechanism to the adjustable actuating connection which is coupled with the aforesaid secondary combining lever.

How the foregoing objects and advantages are attained, together with such others as may be incident to the invention or as will occur to those skilled in this art, will be evident from the following description, taken together with the accompanying drawings, wherein:

Figure 1 is a fragmentary plan view of the running gear of a locomotive, illustrating particularly the cylinders and valve chests, the associated reciprocating parts, and the housing or box for the valve gear of the present invention;

together with the operating connections to and from the valve gear box;

Figure 2 is a plan section through the valve gear box or housing of Figure 1, to a larger scale, and showing the major essentials of the internal or working parts of the valve motion mechanism proper, in top plan, this view being taken approximately on the line 2—2 of Figure 3;

Figure 3 is an irregular vertical longitudinal section through the valve gear box or casing of Figure 2, taken approximately on the line 3—3, and showing the chief elements of the valve gear which actuate the valves of the right-hand cylinder of the locomotive;

Figure 4 is a similar section taken approximately on the line 4—4 of Figure 2, and showing the chief elements of the valve gear which actuate the valves of the left-hand cylinder of the locomotive;

Figure 5 is an irregular sectional view, similar to Figure 3, but showing the parts by which the cross-section or drive is taken from the left-hand part of the valve gear to the right-hand swinging link (such parts being omitted from Figure 3 in order to avoid confusion);

Figure 6 is a similar sectional view, but related to Figure 4, showing the cross-connection for driving the left-hand oscillating link from the right-hand side of the valve gear (such parts being omitted from Figure 4 for the sake of clarity);

Figure 7 is a transverse vertical section through the valve gear box and internal mechanism, taken approximately on the line 7—7 of Figure 2;

Figure 8 is a similar section taken approximately on the line 8—8 of Figure 2;

Figure 9 is a view chiefly in elevation, with certain parts in section, on a still larger scale, of a modified form of mechanical motion or interconnection which may be substituted for certain of the adjustment parts seen at the left-hand end of Figure 3;

Figure 10 is a fragmentary section taken about on the line 10—10 of Figure 9;

Figure 11 is a section on the line 11—11 of Figure 9;

Figure 12 is a view similar to Figure 9 but showing the parts in a different position of adjustment;

Figure 13 is a sectional view similar to Figure 10, but taken on the line 13—13 of Figure 12; and Figure 14 is a perspective view of three of the operating parts of the mechanism shown in Figures 9 to 13, the three parts being serially separated to illustrate how they can be assembled and disassembled.

*Description of typical locomotive arrangement*

Figure 1:
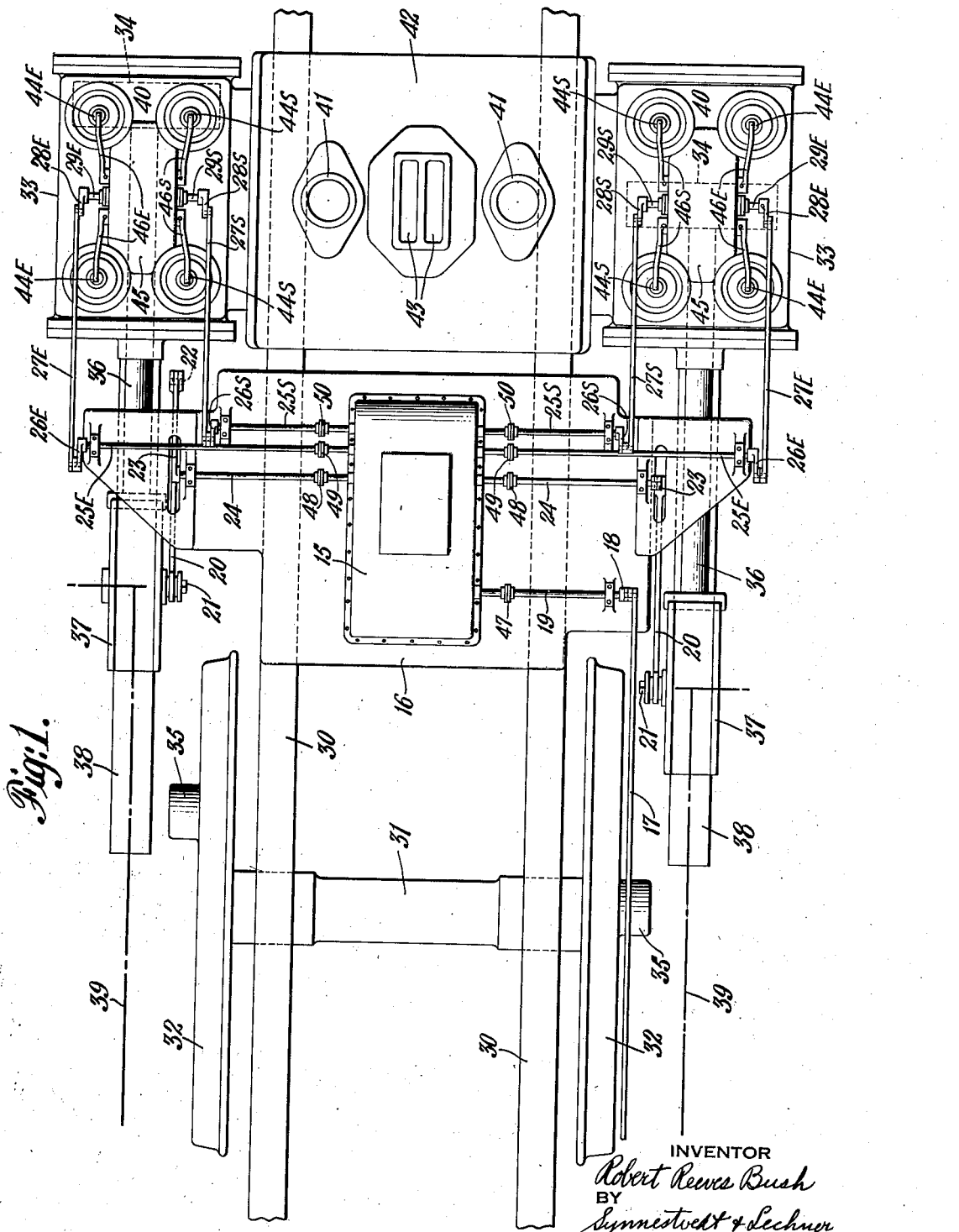

Referring now to Figure 1, it will be seen that the locomotive (the superstructure of which is not here shown) comprises main longitudinal framing 30, axles 31 (one of which is shown), driving wheels 32 (the forward pair of which is illustrated), cylinders 33, pistons diagrammatically indicated in dotted lines at 34, crank pins 35, piston rods 36, crossheads 37, crosshead guides 38, main rods 39 (which are only fragmentarily and diagrammatically indicated but which it will be understood couple the crossheads 37 to crank pins on drivers to the rear of those shown), valve chests 40, steam delivery pipes 41, saddle structure 42, steam exhaust outlets 43 for delivery to the nozzle (not shown), steam admission and exhaust valves, the stems or tappets of which are indicated at 44S and 44E, and cam boxes 45 containing the oscillatable inlet and exhaust cams (not shown) by which the valve operating arms 46S and 46E are actuated; all of which, for purposes of illustration, are similar to the corresponding parts of the locomotive illustrated in Figures 1 and 2 of the above mentioned Patent 2,138,053.

Also similar to the general arrangement of the application just mentioned, is the arrangement of the casing or box 15 for housing the major portion of the valve gear proper, said casing being mounted in any convenient manner, as by the base plate 16 which extends across from one side of the locomotive to the other and rests upon the main frame. The connection of the reach rod 17 to the interior of the valve gear box is by means of a crank arm 18 fixed on the end of a rockshaft 19 extending into said box. Still further, in accordance with said general arrangement, the actuating connection from the two crossheads to the valve motion mechanism in the box, is by means of links 20, each coupled at its rear end by a pivotal connection 21 to a crosshead, and at its forward end by a pivotal connection 22 to the lower end of a lever 23, the upper end of which is fixed upon a rockshaft 24 extending into the valve gear box; and the steam and exhaust valve operating rockshafts 25S, 25E, extend outwardly from said box and fixedly carry arms or levers 26S, 26E, the upper ends of which are pivotally coupled to the rear ends of the actuating links 27S, 27E, which at their forward ends are pivoted to the free ends of cam shaft crank arms 28S, 28E, which are fixed upon the independent steam and exhaust cam rockshafts 29S, 29E. The various rockshafts 19, 24, 25E and 25S, may incorporate disconnectible couplings 47, 48, 49 and 50, located exteriorly of the box 15, for purposes of assembly and disassembly.

Further description of the general setting of the invention is not necessary here, nor is there need for illustration of the interior parts of the valve chests and cam boxes, since for a fuller understanding thereof reference may be had to said copending application 121,398 (now Patent 2,138,053).

*Description of the valve gear proper*

Turning now to Figures 2 to 8 inclusive, it will be noted that where the delivery and takeoff rockshafts pass into the inside of the box, the designating numerals have the suffix or index letter R or L, for the right and left sides of the mechanism, respectively. Insofar as practicable, the details of the mechanism will now be described with reference to the portions of the valve gear which operate the valves at the right-hand side of the locomotive, the lefthand half of the mechanism being in most respects a counterpart.

The rockshaft 24R, which is oscillated by the right-hand crosshead, through link 20 and arm 23, serves as one trunnion for the oscillating transmission yoke or lever 51R, the other trunnion of which at 52R is mounted by suitable bearings in a central support 53.

The oscillating yoke 51R has the function of transmitting motion of the right-hand crosshead to the combining lever mechanism for the valves of the right-hand cylinder, and to this end it pivotally carries at 54R a combining lever structure which comprises a sleeve 55R with integral admission and exhaust combining lever members 56R, 57R, the other connections to which will be described hereinafter. The yoke member 51R further has the function of transmitting motion of the right-hand crosshead to the left-hand side of the mechanism, particularly to the swinging link thereof, and to this end it has a downwardly extending arm 51R' (see Figures 6 and 8), which has pivotally coupled thereto at 58R one end of a link 59R, the other end of which is pivoted at 60R to an arm 61R fixed on a short transverse rockshaft 62. The crossover shaft 62 fixedly carries another arm 63L, which in turn is pivoted at 64L to a link 65L, the other end of which is pivoted at 66L to an arm 67L fixed on and extending upwardly from the inner trunnion member 68L' of the left-hand arcuate swinging link 69L, which is thus oscillated in unison with the right-hand crosshead of the locomotive.

Similarly, in order to actuate the right-hand swinging link 69R (as seen from Figures 2, 5, 7 and 8), the left-hand primary oscillating yoke 51L, which is actuated from the left-hand crosshead by means of the rockshaft 24L, carries (below its trunnion 52L) a downward extension 51L', which is pivotally coupled at 58L to the forward end of a link 59L, the rear end of which is pivoted at 60L to an arm 61L fixed upon a short transverse rockshaft 70. Said shaft crosses over to the right of the longitudinal central vertical plane of the mechanism and there carries a second fixed arm 63R, which in turn is pivoted at 64R to one end of a short link 65R, the other end of which is pivoted at 66R to a downwardly extending arm 67R which is fixed on the inner trunnion 68R' of the right-hand swinging link 69R, whereby said link is oscillated in unison with the left-hand crosshead of the locomotive engine.

By comparison of Figures 5 and 6, it will be seen that the crossover connections for transmitting the motion from the left-hand yoke 51L to the right-hand swinging link 69R are placed lower in the casing than are the corresponding connections transmitting the motion from the right-hand yoke 51R to the left-hand link 69L. This is not only for clearance purposes, but also in order that the respective transmission connections to the two swinging links shall be, respectively, below and above the oscillating centers thereof, since it is necessary that the swinging link on one side be oscillated in like sense with the reciprocations of the piston at the opposite side of the locomotive and that the swinging link on the other side should be oscillated in opposite sense to the reciprocations of the opposite piston, in order that the valves for both cylinders will be timed for forward or reverse operation, respectively, when the link blocks in the two links are both moved by the reversing mechanism to their lower or upper positions, respectively. Otherwise, it would be necessary, in a two cylinder engine having the conventional 90° relative angular setting of the cranks, to employ a more complicated reversing mechanism, which would lower the link block in one swinging link simultaneously with the raising of the link block in the other swinging link. This principle is explained more fully in the first mentioned of the said copending applications, i. e., No. 58,504 (now Patent 2,136,405).

Having now explained the actuation of the right-hand oscillating yoke 51R from the right-hand crosshead, and the actuation of the right-hand swinging link 69R from the left-hand crosshead, there now follows an explanation of the combining of these motions, for the right-hand side of the mechanism, and the actuation of the valves for the right-hand cylinder.

The radius rod 71R is at its rear end pivoted at 71R' in a link block 72R which is slidable in the arcuate link 69R, and this adjustment (for alteration of cut-off, and for reversal of the engine) is effected by means of the lifting links 73R which are pivoted at 74R to the radius rod 71R and at 75R to the arm 76R which is fixed on the reversing shaft 19, the latter being actuated, as before stated, by means of an arm 18, outside the valve gear box, which is there coupled to the reach rod 17.

The forward end of the radius rod 71R is pivoted at 77R to the combining lever member 56R, with the result that the entire combining lever assembly 55R—56R—57R as a unit receives a variable component of motion from the radius rod, according to the adjustment of the link block up and down in the swinging link 69R, which latter is oscillated in synchronism with the reciprocation of the left-hand piston of the locomotive. The combining lever assembly, of course, also receives a fixed predetermined component of motion from the yoke 51R which oscillates in unison with the reciprocation of the right-hand piston.

The take-off from the combining lever mechanism to the steam valve actuating rockshaft 25SR is by means of a link 78R which has its rear end pivoted at 79R to the lower end of the admission combining lever member 56R and has its forward end pivoted at 80R to an arm 81R fixed upon the rockshaft 25SR, which through the intermediation of the external lever 25S, link 27S, arm 28S and cam shaft 29S, actuates the steam admission valves of the right-hand cylinder.

*Description of the major features of the present invention*

The take-off from the exhaust combining lever member 57R to the exhaust valves is carried through a secondary combining lever, as will now be described. This take-off is by means of a link 82R, pivoted to said combining lever member at 83R, and having connection to an arm 84R fixed on rockshaft 25ER, through the intermediation of a secondary combining lever 85R, which at one end has a pivotal connection 86R to said link 82R and at an intermediate point has a pivotal mounting 87R upon the said arm 84R. The lower end of the secondary combining lever 85R is pivoted at 88R to the forward end of a long rod or link 89R, the rear end of which is pivoted at 90R in a block 91R, slidable in a guideway or supplemental link member 92R which is fixed to and oscillates with the swinging link 69R.

The pivot center 90R, by the sliding of the block 91R in the guideway 92R, is adjustable from the extreme position shown in Figure 3 upwards to a point where said pivot center coincides with the center of oscillation of the trunnion 68R of the swinging link 69R, and this adjustment is effected in a predetermined relationship to the adjustment of the radius rods by the reversing mechanism. It may be effected by any suitable mechanism, one form being shown in Figures 2 and 3, and an alternative form being shown in Figures 9 to 14 inclusive.

Referring to Figures 2 and 3, the reversing shaft 19 carries a toothed sector 93, which meshes with a gear 94, fixed on stubshaft 95, and carrying an eccentric or crank 96. Pivoted on said crank is one end of a link 97, the other end of which is pivoted at 98 to an arm 99 fixed on a cross-shaft 10, which extends from the right-hand to the left-hand side of the valve gear box. Considering the right-hand side of the mechanism, it will be seen that the shaft 100 fixedly carries another arm 101R, which is pivoted at 102R to the upper end of a lifting link 103R, the lower end of which is pivoted by pin 90R to the slidable block 91R.

The parts of the valve motion mechanism are shown in mid-gear position. In this position the rear end pivot 71R' of the radius rod 71R (see Figure 2) is on the center of oscillation of the swinging link 69R (see Figure 3), so that no motion is transmitted from the link to the combining lever assembly 55R—56R—57R. Said combining lever assembly is thus under these conditions oscillated solely by the primary transmission yoke 51R which is oscillating in synchronism with the reciprocation of the right-hand piston, and the admission valves are being thereby actuated for a timed opening and closing just equal to the desired preadmission. The exhaust valves, on the other hand, are receiving a relatively minor motion from the main combining lever 57R, since the motion derived therefrom, and transmitted through the link 82R to the secondary combining lever 85R and thence to lever 84R, is substantially modified by the movement imparted to the other end of said secondary combining lever by the link 89R which is receiving motion from the guideway 92R which swings in unison with the swinging link 69R.

As illustrative of the effect of this motion taken from the swinging link 69R to the secondary combining lever 85R, reference may be made to Figures 3 and 4, which show the corresponding parts at the right and left sides of the mechanism. From Figure 3 it will be seen that the right-hand swinging link 69R is inclined to one extreme of its oscillation, corresponding to the extreme forward position of the left-hand piston (dead center position of left-hand crank 35—see Figure 1), and the right-hand oscillating yoke 51R stands substantially vertically, corresponding to the half-stroke position of the right-hand piston (the right-hand crank 35 being adjacent the bottom of its cycle—as seen in Figure 1—the locomotive illustrated being one in which the right-hand crank is the leading crank). From Figure 4 it will be seen that the left-hand swinging link 69L stands substantially in its vertical position, corresponding with the half-stroke position of the right-hand piston, and the left-hand oscillating yoke 51L is inclined to one extreme of its oscillation, corresponding to the forwardmost position of the left-hand piston.

Thus, taking the two sides of the mechanism as illustrative of full-stroke and half-stroke positions for either side, it will be seen that the steam valve actuating levers 26S (Figs. 3 and 4) are at substantially differing angles. Yet the right and left exhaust valve actuating levers 26E (Figures 3 and 4) are both at substantially the same angle of inclination, which shows that as the pistons and cranks move through their cycles, the motion derived from the exhaust combining lever is to a large extent modified by means of the secondary combining lever which (in mid-gear position of the valve motion mechanism) receives a substantial component of motion from the swinging link.

It will now be seen (from Figure 3) that as the reversing lever 18 is moved forward or backward from the mid-gear position shown, the two radius rods 71R, 71L will be moved downwards or upwards in the arcuate swinging links. This action, of course, causes forward or reverse operation of the engine, and introduces an adjustably variable component of motion from the links to the combining levers, for adjustment of the cut-off and of the other valve events (admission, release and compression).

However, as the radius rod link blocks 72R, 72L, are moved progressively downward from the center of oscillation of the links (for forward operation) or progressively upward from the center of oscillation of the links (for reverse operation), the distance of the pivot centers 90R, 90L, of the supplemental rods or links 89R, 89L, from the centers of oscillation of the swinging links 69R, 69L, is progressively decreased. For the right-hand side of the mechanism, this is accomplished (as seen in Figure 3) by the elements 93, 94, 96, 97, 98, 99, 100, 101R, 102R and 103R.

As the connection 97 from the eccentric pin 96 to the lever 99 is on dead center when the valve motion mechanism is in mid-gear, it will readily be seen that movement of the toothed sector 93 either upwards (with forward motion of the reversing arm 18) or downwards (with rearward motion of the reversing arm 18) will in either case produce a progressive reduction of the offset of pin 90R from the center of oscillation of the swinging link 69R. In other words, a full throw of the reversing lever 18, moving the link block 72R of the radius rod 71R from one extreme position of the link 69R to the opposite extreme position (i. e., from full-gear forward to full-gear reverse, or vice versa) is accompanied by a movement of the sliding block 91R of the supplemental connecting link 89R from its uppermost position in the guideway 92R, i. e., from the position where the pin 90R coincides with the axis of oscillation 68R of the link 69R, downwardly to the lowermost position in the guideway 92R and thence upwardly again to said center of oscillation.

Thus, when the link block of the radius rod 71R is in either extreme position within the swinging link 69R, giving to the combining mechanism the maximum component of link motion, the supplemental combining lever (through the supplemental link 89R) receives zero component of movement from the link motion; whereas, when the radius rod 71R is in mid-gear and thus receives zero component of movement from the link motion, the supplemental rod 89R receives its maximum movement from the link motion.

The adjustment of these parts, from the reversing shaft 19, is the same at the left-hand side as it is at the right-hand side which has just been described. This will be evident from Figures 2 and 4, which show the corresponding parts 101L, 102L, 103L, 90L, 91L, 92L, etc., by which the supplemental left-hand rod 89L is adjusted in synchronism with the adjustment of the reversing mechanism. As all the remaining parts of the valve gear are duplicated at the two sides, it will be unnecessary to describe in detail the structure at the left-hand side of the valve motion mechanism.

From the foregoing, it will now be evident that in the present embodiment of the invention (as in the case of the aforementioned Woodard Patent 2,136,405), the timing of the steam admission valves is determined by a combination of the following motions (considering, for example, the valves at the right-hand side of the engine): first, a motion of uniform amplitude and bearing a constant relation, as to direction, relative to the motion of the right-hand piston, which motion is derived from the right-hand crosshead and delivered to the combining mechanism by the primary oscillating yoke member 51R; and, second, a motion which is capable of being varied in amplitude and of being reversed in direction, which motion is derived from a part of the engine in different phase, e. g., from the left-hand crosshead, and is delivered to the right-hand combining mechanism by way of the connections from the left-hand yoke 51L to the right-hand swinging link 69R. For the latest cut-off desired the link block is placed in its extreme position in the link, thus imparting to the radius rod and thence to the combining lever assembly (from which the admission valves are driven) the maximum amount of motion which the link provides. This motion, in combination (by means of the admission combining lever member 56R) with the motion of the oscillating yoke 51R produces the requisite timing of the admission valves for the latest cut-off desired. As the link block is moved progressively toward the center of the link, a smaller and smaller motion of the link is imparted to the radius rod and thence to the combining lever mechanism, the motion of the oscillating yoke member 51R remaining always the same, with the result that the timing of the admission valves is progressively such as to give an earlier cut-off. When the link block is moved to the central position, there is no motion imparted by the link to the radius rod and combining lever, and the timing of the admission valves is then determined entirely by the motion of the oscillating yoke member 51R driven in synchronism with the right-hand crosshead and piston. This is mid-gear position of the valve motion and corresponds with the earliest cut-off, which cut-off is equal to the pre-admission. As the link block is moved toward the opposite end of the link the procedure is reversed, the cut-off being progressively lengthened, the resultant position and timing of the admission valves with relation to the steam portage at the two ends of the cylinder producing a reversal of the engine.

The timing of the exhaust valves (still considering the right-hand part of the mechanism) is, in general, effected by the major parts of the mechanism as just described for the admission valves (including the oscillating yoke 51R, the swinging link 69R, the radius rod 71R, etc.), but the variably combined motion, taken off from the exhaust combining lever member 57R is modified (as the cut-off is progressively decreased), by a progressively increasing component of motion taken from the swinging link, by way of the supplemental rod 89R and the secondary combining lever 85R, the action of which is to effect a differential variation of the timing of the exhaust valves as compared with the timing of the admission valves, so that as the cut-off is progressively made earlier and earlier, the release and compression events do not come as early as they otherwise would.

It will be readily understood that one of the disadvantages of ordinary valve gears is the fact that the progressive adjustment of the release and compression events is inextricably tied up with the progresisve adjustment of the admission and cut-off events, with the result that at very early or short cut-offs the release and compression events come much sooner than is desired. By the present mechanism there is secured a substantial improvement in the timing of the release and compression events at short cut-offs, even though the admission and exhaust valves are adjusted by means of an identical control member, i. e., the reverse lever.

The particular means of co-ordinated adjustment between the reversing shaft 19 and the mechanism for modifying the motion taken off from the exhaust combining lever mechanism (i. e., the sector and gear arrangement 93, 94, and associated links and levers hereinbefore described with reference to Figures 2 and 3), which is similar to certain parts of the exhaust adjusting mechanism shown in said copending application No. 217,360, is herein employed, as a convenient means for securing the adjustment of the link motion delivered to the secondary combining lever. I have, however, evolved an alternative mechanical movement for effecting this adjustment, which will now be described with reference to Figures 9 to 14 inclusive.

From Figure 9 it will be seen that the shaft 19' (adjustable by the lever 18') may have a system of bell cranks, linkages, etc., coupled to it in a manner to raise and lower the pin 102a (which corresponds to the pins 102R and 102L shown in Figures 3 and 4) for raising and lowering the pivot centers 90R and 90L, through lifting links 103R and 103L, to adjust the motion delivered to the secondary combining lever in accordance with the adjustment of the valve gear. This mechanism is mounted by and supported in a frame comprising a base member 104 (see Figure 11) and right and left upright members 105 which may be secured to said base as by pins or bolts 104a. The base member may be mounted on any suitable support within the valve gear casing 15 or directly on the floor thereof. The shaft 19' may be a supplemental shaft having its arm 18' coupled to an arm on the reversing shaft 19; or alternatively the shaft 19' and arm 18' may be considered to be identical with the reversing shaft 19 and reversing arm 18, but relocated in the box to cooperate with the modified structure now being described.

Near the top of the side frame members 105, these parts have forward extensions 105a which are secured together by a through stud 106 having retaining nuts 107 threaded thereon, said stud having an intermediate portion 108 of an enlarged diameter to serve as a pivot for the bell crank 109. Toward the rear, the frame parts 105 have extensions 105b which may be held in their relative positions by suitable collars 110 fixed on the reversing shaft 19', on which shaft the bell crank 111 is fixed as by a key 112. The reversing arm 18' is, of course, also fixed on said shaft. The two bell cranks 109 and 111 have downwardly extending arms 109a and 111a which are coupled together by links 113 and pivot pins 114, so that, upon adjustment of the reversing shaft 19' by the reversing lever 18', the bell crank 111 rocks with said shaft, and the bell crank 109, by means of the linkage 113, rocks in unison with the bell crank 111 (as best seen in Figure 12). The two bell cranks have their other arms 109b and 111b extending generally horizontally toward each other (when the mechanism is in a position corresponding to mid position to the reversing mechanism), the function of which will be hereinafter described.

Fixed upon the inner face of each side frame member 105, as by screws or studs 115, is an upstanding guide plate member 116 (best seen in Figures 9 and 14). Said guide plates have upright slots 117 cut therethrough (as seen in Figures 9, 11 and 14) serving as guideways for the vertically movable pin 98a, which corresponds in function to the pin 98 of the embodiment shown in Fig. 3. On the outer ends of pin 98a may be placed a pair of levers 101a, having working slots 101b (one of which is diagrammatically shown), which correspond in function to the levers 101R and 101L of Fig. 2; any suitable fixed pivot or fulcrum point 100a being provided, in place of the shaft 100 seen in Figs. 2 and 3. To the pivots 102a may be coupled the upper ends of lifting links such as those shown at 103R and 103L in Figures 3 and 4, thus completing the connections to the supplemental adjustable rods 89R, 89L.

Below the slot 117, each guide plate 116 has a U-shaped guideway or cam track 118, the two legs of which respectively guide in a vertical path the positioning pins 119 which are fixed in and serve to prevent swinging displacement of the lower end of the lifting member 120 (see Figure 14) which carries the pin 98a.

The raising of the pin 98a in the guideways 117 is accomplished through the intermediation of the member 120. At each face of the member 120 is another member 121 (one of which is shown in Figure 14) which is designed to effect the lowering of the pin 98a. Each of the two members 121 has at its upper end a hole 122 through which the pin 98a passes, with freedom for relative rocking. At an intermediate region, the member 121 has an arcuate slot 123 cut therethrough, through which pass the pins 119. Adjacent the bottom, the members 121 are fitted on to a pin 124, the ends of which ride in the U-shaped guideways 118.

It will now be seen that when the parts 120, 121 and 116 (individually shown in Figure 14) are assembled together with their faces abutting—it being understood that the member 120 lies between two of the members 121, and that the latter lie between two of the members 116—the members 120 and 121 may slide up and down as a unit between the members 116, pin 98a being guided in slots 117, pins 119 being guided in the two legs of the U-shaped slots 118, and pin 124 being movable alternatively in either of the legs of the U-shaped slots, since the members 121 may swing about the pin 98a as a pivot.

The arms 109b and 111b of the bell cranks both underlie the bottom of member 120 and partially overlie the pin 124, when the parts are in the position of Figure 9, i. e., when the valve gear is in mid-position, and at this time the pin 98a is at its lowermost position, and is there retained by the bell crank levers.

As the reversing shaft 19' is turned by its lever 18', clockwise to the position shown in Figure 12, corresponding to full-forward position of the valve gear, the following sequence of events occurs: the upper curved surface 125 of bell crank arm 109b commences to lift the member 120 and thus the pin 98a, and about the same time the protruding arcuate surface 126 of the bell crank lever 111b pushes the pin 124 forwardly (as seen in Figure 9), whereupon said pin can ride up the forward leg of the U-slot 118 (Figure 12). In any given position of adjustment of the valve gear, in the forward range of valve gear adjustment, the pin 98a is held in a corresponding position of adjustment in the slots 117, by means of the bell crank arm 109b, the upper curved surface 125 of which bears against the bottom of the member 120, and the lower curved surface 127 of which bears against the top of the locking pin 124; the bell crank arm 111b being at this time entirely free of said parts, and thus ceasing to function.

Upon movement of the reversing gear into the reverse range, the bell crank 111 controls the vertical position of the pin 98a; the bell crank 109 being then non-functioning, so far as the positioning of said pin is concerned.

Thus, whether the reversing shaft is moved into its forward range or oppositely into its rearward range (for increase in valve gear cut-off adjustment), the pin 98a is in either case raised, which answers to the required condition, i. e., that the pins 90R and 90L of the supplemental connections to the secondary combining levers should be raised with increase in cut-off adjustment. In either case, the position of the pin 98a is positively fixed for any given position of adjustment of the valve gear, since the particular bell crank which is functioning in the forward range or in the reverse range is positively interlocked with the connections to pin 98a, by means of that arm of the bell crank which fits between the member 120 and the pin 124.

From the foregoing detailed description of the mechanism, it will now be evident how I secure the various objects and advantages set forth in the earlier part of this specification, and particularly how the motion taken off from the primary combining lever mechanism is modified by means of a supplemental linkage and a secondary combining lever in order to avoid excessively early release and compression events of the exhaust valves at early cut-off adjustments of the admission valves.

I claim:

1. In locomotive valve gear, a primary combining lever actuated by a plurality of locomotive parts moving in different phase relation, a secondary combining lever receiving as a component of its motion the combined motion of said primary combining lever, a connection to said secondary combining lever from one of the parts which actuated the primary combining lever, to supply another component of the motion of said secondary lever, and valve actuating connections coupled to each of said levers to take separate motions therefrom.

2. In locomotive valve gear, a primary combining lever actuated by a plurality of locomotive parts moving in different phase relation, means for controllably varying at least one of the motions delivered to said mechanism, a secondary combining lever receiving as a component of its motion the combined motion of said primary combining lever, a connection to said secondary combining lever from one of the parts which actuate the primary combining lever, to supply another component of the motion of said secondary lever, and valve actuating connections coupled to each of said levers to take separate motions therefrom.

3. In locomotive valve gear, a primary combining lever actuated by a plurality of locomotive parts moving in different phase relation, means for controllably varying at least one of the motions delivered to said mechanism, a secondary combining lever receiving as a component of its motion the combined motion of said primary combining lever, a connection to said secondary combining lever from one of the parts which actuate the primary combining lever, to supply another component of the motion of said secondary lever, means for controllably varying the motion delivered by said connection to said secondary combining lever, and valve actuating connections coupled to each of said levers to take separate motions therefrom.

4. For a locomotive engine having cylinders, pistons and other moving parts actuated thereby, and for each cylinder relatively movable admission valve means and exhaust valve means, a valve gear comprising, for the valve means of each cylinder, combining mechanism actuated by a plurality of said parts and delivering the combined motion for timing one of said valve means, and secondary combining means receiving the combined motion of said combining mechanism and a motion from one of the parts which actuate said mechanism and delivering the resulting motion for timing the other of said valve means.

5. For a locomotive engine having cylinders, pistons and other moving parts actuated thereby, and for each cylinder relatively movable admission valve means and exhaust valve means, a valve gear comprising, for the valve means of each cylinder, combining mechanism actuated by a plurality of said parts and delivering the combined motion for timing one of said valve means, adjustable means for altering the component of motion received by said combining mechanism from one of said parts, and secondary combining means receiving the combined motion of said combining mechanism and a motion from one of the parts which actuate said mechanism and delivering the resulting motion for timing the other of said valve means.

6. For a locomotive engine having cylinders, pistons and other moving parts actuated thereby, and for each cylinder relatively movable admission valve means and exhaust valve means, a valve gear comprising, for the valve means of each cylinder, combining mechanism actuated by a plurality of said parts and delivering the combined motion for timing one of said valve means, adjustable means for altering the component of motion received by said combining mechanism from one of said parts, secondary combining means receiving the combined motion of said combining mechanism and a motion from one of the parts which actuate said mechanism and delivering the resulting motion for timing the other of said valve means, and a second adjustable means for altering one of the component motions received by said secondary combining means.

7. For a locomotive engine having cylinders, pistons and other moving parts actuated thereby, and for each cylinder relatively movable admission valve means and exhaust valve means, a valve gear comprising, for the valve means of each cylinder, combining mechanism actuated by a plurality of said parts and delivering the combined motion for timing one of said valve means, adjustable means for altering the component of motion received by said combining mechanism from one of said parts, secondary combining means receiving the combined motion of said combining mechanism and a motion from one of the parts which actuate said mechanism and delivering the resulting motion for timing the other of said valve means, and a second adjustable means for altering one of the component motions received by said secondary combining means, and a common control for both said adjustable means.

8. For a locomotive engine having cylinders, pistons and other moving parts actuated thereby, and for each cylinder relatively movable admission valve means and exhaust valve means, a valve gear comprising, for the valve means of each cylinder, combining mechanism actuated by a plurality of said parts and delivering the combined motion for timing one of said valve means, adjustable means for altering the component of motion received by said combining mechanism from one of said parts, secondary combining means receiving the combined motion of said combining mechanism and a motion from one of the parts which actuate said mechanism and delivering the resulting motion for timing the other of said valve means, and a second adjustable means for altering the component of motion received by said secondary combining means from the said moving part.

9. For a locomotive engine having cylinders, pistons and other moving parts actuated thereby, and for each cylinder relatively movable admission valve means and exhaust valve means, a valve gear comprising, for the valve means of each cylinder, combining mechanism actuated by a plurality of said parts and delivering the combined motion for timing one of said valve means, adjustable means for altering the component of motion received by said combining mechanism from one of said parts, secondary combining means receiving the combined motion of said combining mechanism and a motion from the parts which actuate said mechanism and delivering the resulting motion for timing the other of said valve means, and a second adjustable means for altering one of the component motions received by said secondary combining means, and a common control for both said adjustable means having control connections coupled to effect inverse alteration of the stated components of motion.

10. For a locomotive engine having cylinders, pistons and other moving parts actuated thereby, and for each cylinder relatively movable admission valve means and exhaust valve means, a valve gear comprising, for the valve means of each cylinder, combining mechanism actuated by a plurality of said parts and delivering the combined motion for timing the admission valve means, and secondary combining means receiving the combined motion of said combining mechanism and a motion from one of the parts which actuate said mechanism and delivering the resulting motion for timing the exhaust valve means.

11. For a locomotive engine having cylinders, pistons and other moving parts actuated thereby, and for each cylinder relatively movable admission valve means and exhaust valve means, a valve gear comprising, for the valve means of each cylinder, combining mechanism actuated by a plurality of said parts and delivering the combined motion for timing the admission valve means, adjustable means for altering the component of motion received by said combining mechanism from one of said parts whereby to alter the cut-off of the admission valve means with reference to the piston stroke, and secondary combining means receiving the combined motion of said combining mechanism and a motion from one of the parts which actuate said mechanism and delivering the resulting motion for timing the exhaust valve means.

12. For a locomotive engine having cylinders, pistons and other moving parts actuated thereby, and for each cylinder relatively movable admission valve means and exhaust valve means, a valve gear comprising, for the valve means of each cylinder, combining mechanism actuated by a plurality of said parts and delivering the combined motion for timing the admission valve means, adjustable means for altering the component of motion received by said combining mechanism from one of said parts whereby to alter the cut-off of the admission valve means with reference to the piston stroke, and secondary combining means receiving the combined motion of said combining mechanism and a motion from one of the parts which actuate said mechanism and delivering the resulting motion for timing the exhaust valve means, and a second adjustable means for altering one of the components of motion received by said secondary combining means whereby to effect a delay of the release and compression events of the exhaust valve means as compared with the timing of such events which would otherwise occur upon adjustment of the timing of the admission valve means for early cut-offs.

13. For a locomotive engine having a pair of cylinders, pistons and other moving parts actuated thereby, and for each cylinder relatively movable admission valve means and exhaust valve means, a valve gear comprising, for the valve means of each cylinder, a yoke member or the like oscillated in synchronism with the reciprocation of the piston in said cylinder, an arcuate swinging link or the like oscillated in synchronism with the reciprocation of the piston in the opposite cylinder, a combining lever or the like pivotally coupled to said yoke and having a connection adjustably coupling it to said link for variation and reversal of the motion delivered by said link to said lever, connections from said lever to the admission valve means for actuating the latter in timed relation to the reciprocation of the piston in said cylinder, a secondary combining lever or the like coupled to said first mentioned lever, an adjustable connection coupling said secondary lever to said link, and actuating connections from said secondary lever to said exhaust valve means for actuating the latter in timed relation to the reciprocation of the piston in said cylinder.

14. For a locomotive engine having a pair of cylinders, pistons and other moving parts actuated thereby, and for each cylinder relatively movable admission valve means and exhaust valve means, a valve gear comprising, for the valve means of each cylinder, a yoke member or the like oscillated in synchronism with the reciprocation of the piston in said cylinder, an arcuate swinging link or the like oscillated in synchronism with the reciprocation of the piston in the opposite cylinder, a combining lever or the like pivotally coupled to said yoke and having a connection adjustably coupling it to said link for variation and reversal of the motion delivered by said link to said lever, connections from said lever to the admission valve means for actuating the latter in timed relation to the reciprocation of the piston in said cylinder, a secondary combining lever or the like coupled to said first mentioned lever, an adjustable connection coupling said secondary lever to said link, actuating connections from said secondary lever to said exhaust valve means for actuating the latter in timed relation to the reciprocation of the piston in said cylinder, and a control device coupled to both adjustable connections in such manner as to increase the motion delivered from the link to the secondary combining lever upon decrease of the motion delivered from the link to the first mentioned combining lever.

15. In a locomotive engine or the like, having at each side a cylinder, piston and other moving parts, and admission valve means and separately movable exhaust valve means for each cylinder, a valve gear comprising an oscillating yoke or transmission lever at each side, said yokes being actuated in unison respectively with parts of said engine moving in different phase relation, a pair of arcuate swinging links, one for each side, a crossover connection for oscillating the link of one side from and in like sense with the yoke at the other side, a crossover connection for oscillating the other link from and in opposite sense to the other yoke, a combining lever assembly pivotally mounted on each yoke to receive motion therefrom, for the combining lever assembly at each side a radius rod coupled thereto and slidably mounted in the link for that side and movable in the link on either side of the latter's center of oscillation whereby each combining lever assembly may receive a variable and reversible component of motion from the corresponding link, a take-off connection from the combining lever assembly at each side and coupled to the admission valve means at that side for timing the same with relation to the reciprocation of the corresponding piston, a secondary combining lever at each side having a take-off connection from the respective combining lever assembly and having a second actuating means adjustably associated with the corresponding link, said adjustable actuating connection being movable toward and away from the link's center of oscillation at one side only of said center whereby the motion of said secondary combining lever is differentially variable with relation to the motion of the associated combining lever assembly, and operating connections from said secondary combining lever to the exhaust valve means of the corresponding cylinder for the timing of the same with relation to the reciprocation of the piston therein.

16. In a locomotive engine or the like, having at each side a cylinder, piston and other moving parts, and admission valve means and separately movable exhaust valve means for each cylinder, a valve gear comprising an oscillating yoke or transmission lever at each side, said yokes being actuated in unison respectively with parts of said engine moving in different phase relation, a pair of arcuate swinging links, one for each side, a crossover connection for oscillating the link of one side from and in like sense with the yoke at the other side, a crossover connection for oscillating the other link from and in opposite sense to the other yoke, a combining lever assembly pivotally mounted on each yoke to receive motion therefrom, for the combining lever assembly at each side a radius rod coupled thereto and slidably mounted in the link for that side and movable in the link on either side of the latter's center of oscillation whereby each combining lever assembly may receive a variable and reversible component of motion from the corresponding link, a take-off connection from the combining lever assembly at each side and coupled to the admission valve means at that side for timing the same with relation to the reciprocation of the corresponding piston, a secondary combining lever at each side having a take-off connection from the respective combining lever assembly and having a second actuating means adjustably associated with the corresponding link, said adjustable actuating connection being movable toward and away from the link's center of oscillation at one side only of said center whereby the motion of said secondary combining lever is differentially variable with relation to the motion of the associated combining lever assembly, operating connections from said secondary combining lever to the exhaust valve means of the corresponding cylinder for the timing of the same with relation to the reciprocation of the piston therein, and adjusting mechanism coupled to said radius rods for moving them together toward one end or the other of said swinging links for forward and reverse operation respectively.

17. In a locomotive engine or the like, having at each side a cylinder, piston and other moving parts, and admission valve means and separately movable exhaust valve means for each cylinder, a valve gear comprising an oscillating yoke or transmission lever at each side, said yokes being actuated in unison respectively with parts of said engine moving in different phase relation, a pair of arcuate swinging links, one for each side, a crossover connection for oscillating the link of one side from and in like sense with the yoke at the other side, a crossover connection for oscillating the other link from and in opposite sense to the other yoke, a combining lever assembly pivotally mounted on each yoke to receive motion therefrom, for the combining lever assembly at each side a radius rod coupled thereto and slidably mounted in the link for that side and movable in the link on either side of the latter's center of oscillation whereby each combining lever assembly may receive a variable and reversible component of motion from the corresponding link, and take-off connection from the combining lever assembly at each side and coupled to the admission valve means at that side for timing the same with relation to the reciprocation of the corresponding piston, a secondary combining lever at each side having a take-off connection from the respective combining lever assembly and having a second actuating means adjustably associated with the corresponding link, said adjustable actuating connection being movable toward and away from the link's center of oscillation at one side only of said center whereby the motion of said secondary combining lever is differentially variable with relation to the motion of the associated combining lever assembly, and operating connections from said secondary combining lever to the exhaust valve means of the corresponding cylinder for the timing of the same with relation to the reciprocation of the piston therein, and adjusting mechanism coupled to said radius rods for moving them together toward one end or the other of said swinging links for forward and reverse operation respectively, and coupled to said adjustable actuating connections for said secondary combining levers for moving said connections toward the centers of oscillation of the links simultaneously with movement of said radius rods in either direction away from said centers of oscillation.

18. In a locomotive engine or the like, having at each side a cylinder, piston and other moving parts, and admission valve means and separately movable exhaust valve means for each cylinder, a valve gear comprising an oscillating yoke or transmission lever at each side, said yokes being actuated in unison respectively with parts of said engine moving in different phase relation, a pair of arcuate swinging links, one for each side, a crossover connection for oscillating the link of one side from and in like sense with the yoke at the other side, a crossover connection for oscillating the other link from and in opposite sense to the other yoke, a combining lever assembly pivotally mounted on each yoke to receive motion therefrom, for the combining lever assembly at each side a radius rod coupled thereto and slidably mounted in the link for that side and movable in the link on either side of the latter's center of oscillation whereby each combining lever assembly may receive a variable and reversible component of motion from the corresponding link, a take-off connection from the combining lever assembly at each side and coupled to the admission valve means at that side for timing the same with relation to the reciprocation of the corresponding piston, a secondary combining lever at each side having a take-off connection from the respective combining lever assembly and having a second actuating means adjustably associated with the corresponding link, said adjustable actuating connection being movable toward and away from the link's center of oscillation at one side only of said center whereby the motion of said secondary combining lever is differentially variable with relation to the motion of the associated combining lever assembly, and operating connections from said secondary combining lever to the exhaust valve means of the corresponding cylinder for the timing of the same with relation to the reciprocation of the piston therein, and adjusting mechanism coupled to said radius rods for moving them together toward one end or the other of said swinging links for forward and reverse operation respectively, and coupled to said adjustable actuating connections for said secondary combining levers for moving said connections toward the centers of oscillation of the links simultaneously with movement of said radius rods in either direction away from said centers of oscillation, said adjustable mechanism including a reversing shaft rockable into a forward and a reverse range from a mid-gear position, levers and lifting links coupling said shaft to said radius rods, a pair of lifting levers oppositely actuated by said shaft, a lifting pin adapted to be coupled to the said adjustable actuating connections for said secondary combining levers, and means alternatively coupling one of said lifting levers to said lifting pin upon rocking of said reversing shaft in the forward or the reverse range respectively.

19. For adjustable valve gear or the like, a link lifting member, a guideway in which said member is adapted to reciprocate, a pair of shafts, lever arms on said shafts extending toward each other, actuating means for rocking one of said shafts and the lever which is fixed thereon through a forward and a reverse range of adjustment, an interconnection adapted to rock the other lever about the axis of its shaft in opposition to the rocking of said first mentioned lever, and actuating means coupled to said link lifting member and adapted to cooperate alternatively with one or the other of said lever arms to be moved thereby, respectively, upon rocking of said actuable shaft in the reverse or the forward range respectively.

20. For adjustable valve gear or the like, a link lifting member, a guideway in which said member is adapted to reciprocate, a pair of shafts, lever arms on said shafts extending toward each other, actuating means for rocking one of said shafts and the lever which is fixed thereon through a forward and a reverse range of adjustment, an interconnection adapted to rock the other lever about the axis of its shaft in opposition to the rocking of said first mentioned lever, and actuating means coupled to said link lifting member and adapted to cooperate alternatively with one or the other of said lever arms to be moved thereby, respectively, upon rocking of said actuable shaft in the reverse or the forward range respectively, said actuating means comprising a locking element movable alternatively into the path of one or the other of said lever arms.

21. For adjustable valve gear or the like, a link lifting member, a guideway in which said member is adapted to reciprocate, a pair of shafts, lever arms on said shafts extending toward each other, actuating means for rocking one of said shafts and the lever which is fixed thereon through a forward and a reverse range of adjustment, an interconnection adapted to rock the other lever about the axis of its shaft in opposition to the rocking of said first mentioned lever, and actuating means coupled to said link lifting member and adapted to cooperate alternatively with one or the other of said lever arms to be moved thereby, respectively, upon rocking of said actuable shaft in the reverse or the forward range respectively, said actuating means comprising a locking element movable alternatively by one of said lever arms into the path of movement of the other of said lever arms.

22. For adjustable valve gear or the like, a link lifting member, a guideway in which said member is adapted to reciprocate, a pair of shafts, lever arms on said shafts extending toward each other, actuating means for rocking one of said shafts and the lever which is fixed thereon through a forward and a reverse range of adjustment, an interconnection adapted to rock the other lever about the axis of its shaft in opposition to the rocking of said first mentioned lever, and actuating means coupled to said link lifting member and adapted to cooperate alternatively with one or the other of said lever arms to be moved thereby, respectively, upon rocking of said actuable shaft in the reverse or the forward range respectively, said actuating means comprising a locking element movable alternatively by one of said lever arms into the path of movement of the other of said lever arms, and a guideway for said locking element adapted to hold it in the selected path of movement throughout either the forward or the reverse range of adjustment.

ROBERT REEVES BUSH.

CERTIFICATE OF CORRECTION.

Patent No. 2,203,379.   June 4, 1940.

ROBERT REEVES BUSH.

It is hereby certified that error appears in the printed specification of the above numbered patent requiring correction as follows: Page 1, second column, line 47, for "ocur" read --occur--; page 2, first column, line 23, for "cross-section" read --cross-connection--; page 3, second column, line 36, for "25S" read --26S--; page 4, first column, line 3, for "10" read --100--; page 5, second column, line 73, for "to" read --of--; page 6, second column, line 49, claim 1, for "actuated" read --actuate--; and that the said Letters Patent should be read with this correction therein that the same may conform to the record of the case in the Patent Office.

Signed and sealed this 23rd day of July, A. D. 1940.

(Seal)

Henry Van Arsdale,
Acting Commissioner of Patents.